US009767082B2

(12) United States Patent
Mao

(10) Patent No.: US 9,767,082 B2
(45) Date of Patent: *Sep. 19, 2017

(54) METHOD AND SYSTEM OF RETRIEVING AJAX WEB PAGE CONTENT

(71) Applicant: Alibaba Group Holding Limited, Grand Cayman (KY)

(72) Inventor: Wen Mao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 657 days.

This patent is subject to a terminal disclaimer.

(21) Appl. No.: 13/756,886

(22) Filed: Feb. 1, 2013

(65) Prior Publication Data
US 2013/0145253 A1 Jun. 6, 2013

Related U.S. Application Data

(63) Continuation of application No. 12/863,320, filed as application No. PCT/US2010/029444 on Mar. 31, 2010, now Pat. No. 8,413,044.

(30) Foreign Application Priority Data

Apr. 2, 2009 (CN) .......................... 2009 1 0133630

(51) Int. Cl.
G06F 17/00 (2006.01)
G06F 17/22 (2006.01)
G06F 17/30 (2006.01)
(52) U.S. Cl.
CPC .... *G06F 17/2247* (2013.01); *G06F 17/30893* (2013.01)
(58) Field of Classification Search
CPC ...................... G06F 17/2247; G06F 17/30864
See application file for complete search history.

(56) References Cited

U.S. PATENT DOCUMENTS

| 7,149,754 B2 | 12/2006 | Miller et al. |
| 7,178,106 B2 | 2/2007 | Lamkin et al. |
| 7,346,920 B2 | 3/2008 | Lamkin et al. |
| 7,636,883 B2 | 12/2009 | Albornoz et al. |
| 7,752,326 B2 | 7/2010 | Smit |
| 7,958,232 B1 | 6/2011 | Colton et al. |
| 8,032,860 B2 | 10/2011 | Piehler et al. |
| 8,527,860 B1* | 9/2013 | Colton ............. G06F 17/30893 709/203 |

(Continued)

FOREIGN PATENT DOCUMENTS

| JP | 2008071048 | 3/2008 |
| JP | 2008107987 | 5/2008 |

(Continued)

OTHER PUBLICATIONS

W3Schools, Ajax Example, Mar. 14, 2007, w3schools, pp. 1-14 Retrieved: https://web.archive.org/web/20070314070959/http://www.w3schools.com/ajax/ajax_source.asp.*

(Continued)

*Primary Examiner* — Howard Cortes
(74) *Attorney, Agent, or Firm* — Lee & Hayes, PLLC

(57) ABSTRACT

The present disclosure describes a method and a system of retrieving Ajax web page content. The method of retrieving Ajax web page content includes: obtaining information of web page codes; retrieving JavaScript information in the information of the web page codes; analyzing the JavaScript information to determine function(s) that include(s) Ajax call(s) in the web page codes; and triggering the determined function(s) that include(s) the Ajax call(s) to obtain web page content. Through analyzing JavaScript information in web page codes, the above technical scheme obtains function(s) that include(s) Ajax call(s) in the web page codes and further triggers the function(s) to obtain web page content generated thereby, thus achieving retrieval of dynamic content in an Ajax web page. Using the above technical scheme, a search engine can collect more complete web page contents and hence provide a better search service to users.

16 Claims, 3 Drawing Sheets

(56) References Cited

U.S. PATENT DOCUMENTS

| | | | |
|---|---|---|---|
| 2004/0225642 | A1 | 11/2004 | Squillante et al. |
| 2005/0027823 | A1 | 2/2005 | Rana |
| 2005/0071766 | A1 | 3/2005 | Brill et al. |
| 2005/0114771 | A1 | 5/2005 | Piehler et al. |
| 2006/0129635 | A1 | 6/2006 | Baccou et al. |
| 2006/0190561 | A1* | 8/2006 | Conboy ............ G06F 17/30864 709/217 |
| 2006/0230011 | A1* | 10/2006 | Tuttle ................ G06F 17/30864 706/62 |
| 2007/0101258 | A1 | 5/2007 | Xu et al. |
| 2007/0174419 | A1* | 7/2007 | O'Connell .......... G06F 11/0709 709/217 |
| 2008/0040653 | A1 | 2/2008 | Levine |
| 2008/0235671 | A1* | 9/2008 | Kellogg .............. G06F 9/45529 717/139 |
| 2008/0235708 | A1 | 9/2008 | Lopez |
| 2009/0006454 | A1 | 1/2009 | Zarzar et al. |
| 2009/0006985 | A1 | 1/2009 | Fong et al. |
| 2009/0070190 | A1 | 3/2009 | Gorty et al. |
| 2009/0094249 | A1 | 4/2009 | Hawkins |
| 2009/0119675 | A1* | 5/2009 | Higgins ............ G06F 17/30896 719/311 |
| 2009/0125469 | A1* | 5/2009 | McDonald ............ G06N 5/025 706/47 |
| 2009/0172792 | A1* | 7/2009 | Backhouse ............ G06F 21/33 726/6 |
| 2009/0198662 | A1 | 8/2009 | Prabhakar et al. |
| 2009/0204886 | A1 | 8/2009 | Xu et al. |
| 2009/0248622 | A1 | 10/2009 | Zhang et al. |
| 2010/0306528 | A1 | 12/2010 | Andress et al. |
| 2012/0005571 | A1 | 1/2012 | Tang et al. |
| 2012/0011431 | A1 | 1/2012 | Mao |

FOREIGN PATENT DOCUMENTS

| | | |
|---|---|---|
| JP | 2008521147 | 6/2008 |
| JP | 2008186160 | 8/2008 |

OTHER PUBLICATIONS

Shreeraj Shah, Crawling Ajax-driven Web 2.0 Applications, Jan. 18, 2007, Help Net Security pp. 2-11 Retrieved: http://www.net-security.org/article.php?id=973.*

Shreeraj Shah, Hacking Web 2.0 Applications with Firefox, Created Oct. 10, 2006, pp. 1-12 Retrieved: http://www.symantec.com/connect/articles/hacking-web-20-applications-firefox.*

Ali Mesbah et al, Crawling Ajax by Inferring User Interface State Changes, 2008, Delft Univeristy of Technology, pp. 1-14.*

Reto Matter, Ajax Crawl: Making Ajax Applications searchable. Master Tesis, Jul. 31, 2008.*

Bisdorff et al., "The RUBIS Asynchronous Web Service", Mar. 2008, Computer Science and Communication Research Unit Faculty of Sciences, Technology and Communication, University of Luxemborg, 16 pgs.

The Chinese Office Action dated Sep. 13, 2010 for Chinese patent application No. 200910133620.5, a counterpart foreign application of U.S. Appl. No. 12/863,320, 7 pages.

The Extended European Search Report mailed Oct. 25, 2012 for European patent application No. 10759351.9, 3 pages.

Hanakawa et al, "A Web Browser for Ajax Approach with Asynchronous Communication Model", Dec. 2006, IEEE/WIC/ACM International Conference on Web Intelligence, pp. 1-7.

Noda et al., "Rich Internet Applications", Best Practice Reports, UW E-Business Consortium University of Wisconsin-Madison, Nov. 16, 2005, pp. 1-10.

Non-Final Office Action for U.S. Appl. No. 12/863,320, mailed on Mar. 29, 2012, Wen Mao, "Method and System of Retrieving Ajax Web Page Content", 9 pages.

"Detailed Program", (ICDE "09), Internet Archive, retrieved on Mar. 18, 2014 at <<https://web.archive.org/web/20090331215706/http://i.cs.hku.hk/icde2009/detailed_program.htm>>, Mar. 2009, 7 pgs.

Duda, et al., "Ajax Crawl: Making Ajax Applications Searchable", IEEE 25th International Conference on Data Engineering (ICDE '09), IEEE, Mar. 2009, pp. 78-89.

Translated Japanese Office Action mailed Apr. 1, 2014 for Japanese patent application No. 2012-503668, a counterpart foreign application of U.S. Appl. No. 12/863,320, 12 pages.

Ito, "How to use Ajax&JavaScript frameworks for smarter Ajax, Asynchronous JavaScript+XML", WEB+DB Press vol. 31, 1st Ed., Gijutsu-Hyohron Co., Ltd., Japan, Mar. 25, 2006, pp. 64-71 (reference showing well-known technique, No English version).

Translated Japanese Office Action mailed Dec. 1, 2015 for Japanese patent application No. 2015-021591, a counterpart foreign application of U.S. Appl. No. 12/863,320, 8 pages.

* cited by examiner

METHOD AND SYSTEM OF RETRIEVING AJAX WEB PAGE CONTENT

RELATED APPLICATIONS

This application is a continuation of the national stage application Ser. No. 12/863,320, filed Jul. 16, 2010, which claims priority to the international patent application PCT/US10/29444, filed Mar. 31, 2010, which claims priority benefit of Chinese patent application No. 200910133630.5, filed Apr. 2, 2009, entitled "METHOD AND SYSTEM OF RETRIEVING AJAX WEB PAGE CONTENT", which applications are hereby incorporated in their entirety by reference.

TECHNICAL FIELD

The present disclosure relates to fields of networking technologies and, more particularly, to methods and systems of retrieving Ajax web page content.

BACKGROUND

Asynchronous JavaScript and XML (Ajax) is a web page development technology for creating interactive web page applications. For a conventional web page, if a portion of the web page content has been updated, a user can see the updated content only after the entire web page is refreshed. With an Ajax web page however, a user can obtain the updated portion of the content without refreshing the entire web page. From the perspective of a network device, this avoids repeatedly transmitting unaltered information and thus saves network bandwidth and reduces server workload. From a user's perspective, waiting times during web page browsing can be effectively reduced, thus improving user experience.

A search engine is a system that can collect, organize and process Internet information with the capability of providing search services to users. Currently, the search engine has become one of the indispensable auxiliary tools of Internet surfing experience for users. A web crawler, being an important component of the search engine, can automatically retrieve web page content and provide real-time, updated data to the search engine. Though conventional web pages can be supported, existing web crawlers fail to effectively retrieve contents that are generated dynamically by Ajax on Ajax web pages. As a result, dynamic contents on Ajax web pages cannot be collected by the search engine, leading to a failure of the search engine to provide a complete content search service to the user.

SUMMARY OF THE DISCLOSURE

The present disclosure provides a method and a system of retrieving Ajax web page content and to provide a solution for the failure of a search engine to collect dynamic content in an Ajax web page. A technical scheme is described as follows.

The present disclosure provides a method of retrieving Ajax web page content, which includes:
   obtaining information of web page codes;
   retrieving JavaScript information of the web page codes;
   analyzing the JavaScript information to determine functions that include Ajax calls in the web page codes; and
   triggering the functions that include the Ajax calls to obtain web page content.

The present disclosure further provides a system of retrieving Ajax web page content, which includes:
   a web page code acquisition unit, used for obtaining information of web page codes;
   a script retrieving unit, used for retrieving JavaScript information of the web page codes;
   a script analyzing unit, used for analyzing the JavaScript information to determine functions that include Ajax calls in the web page codes; and
   a web page content acquisition unit, used for triggering the functions that include the Ajax calls to obtain web page content.

Through analyzing JavaScript information in web page codes, the above technical scheme obtains functions that include Ajax calls in the web page codes and further triggers the functions to obtain web page content generated thereby, thus achieving retrieval of dynamic content in an Ajax web page. Using the above technical scheme, a search engine can collect more complete web page contents and hence provide a better search service to users.

DETAILED DESCRIPTION

In order to allow someone skilled in the art to understand the technical scheme provided in the present disclosure, implementation methods in the present disclosure are described below in further details using accompanying figures.

Figure 1:
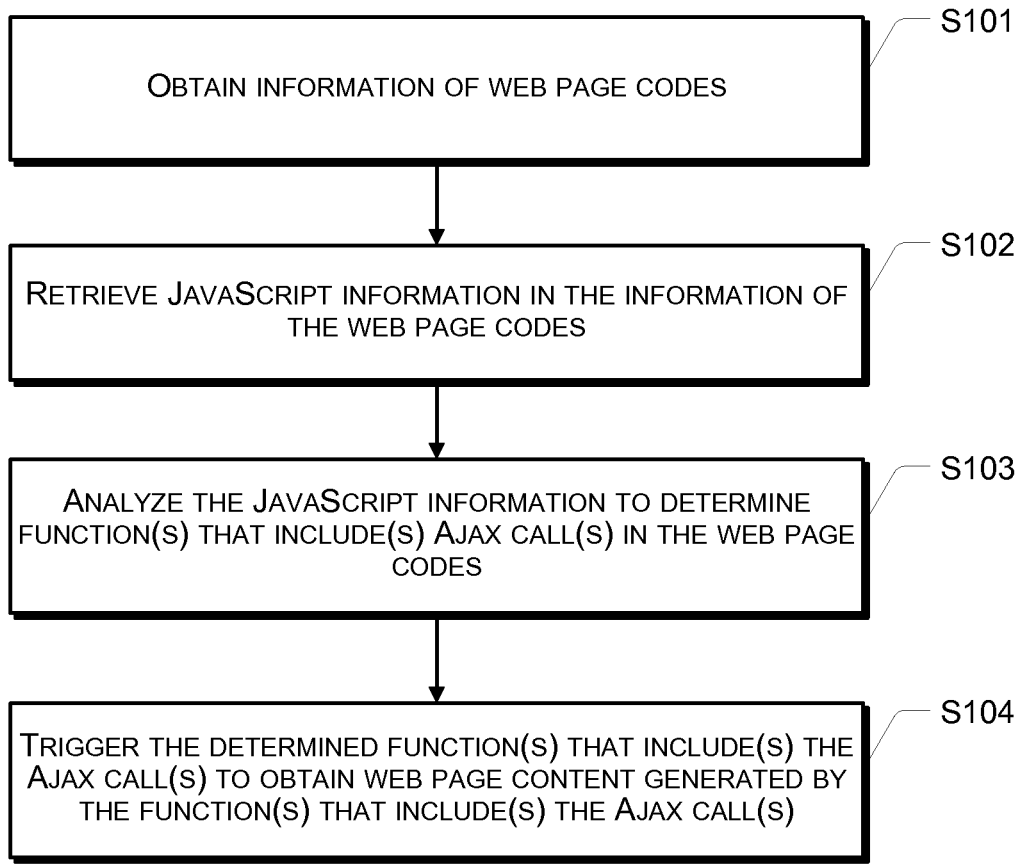
FIG. 1 shows a flow chart of a method of retrieving Ajax web page content in accordance with the exemplary embodiments of the present disclosure.

FIG. 1 shows a flow chart of a method of retrieving Ajax web page content in accordance with the exemplary embodiments of the present disclosure. The method includes the following procedures.

S101 obtains information of web page codes.

This block is similar to the working mechanism of a conventional web crawler. Through an URL (i.e., Uniform Resource Locator) address, information of web page codes corresponding to the address is read from the network.

S102 retrieves JavaScript information of the web page codes.

Upon obtaining the information of web page codes, JavaScript information therein is retrieved first. Use HTML (i.e., Hyper Text Mark-up Language) codes as an example. Generally, the following two approaches may be used to add JavaScript information into HTML codes:
   1) directly embedding JavaScript codes in the HTML codes; or
   2) placing JavaScript codes in an external file and referencing the external file in the HTML codes.

Specifically, with respect to the first approach, the JavaScript codes can be placed between <script> and </script>, a tag pair in the HTML codes. A common format is shown as follows:

```
<script type= "text/javascript">
//js codes
</script>
```

The portion within the <script> tag pair in the above format corresponds to JavaScript codes. Multiple JavaScript sentences may be included within the <script> tag pair. The <script> tag may appear in <head> part of the HTML codes or <body> part of the HTML codes.

With respect to the second approach, the JavaScript codes are placed in an external file. This external file is then referenced through a src property of the <script> tag in the HTML codes. A common format is shown below:

<script type="text/javascript" src="js/text.js"> </script>

Values of the src property define a storage path and a filename of a JavaScript file. The storage path may be an absolute path or a relative path. "test.js" in the above format refers to the JavaScript filename being referenced while "js/" refers to the storage path of that file. A JavaScript file generally uses .js as its extension name, and includes mere JavaScript codes, having no <script> tag or other HTML tags.

Figure 2:
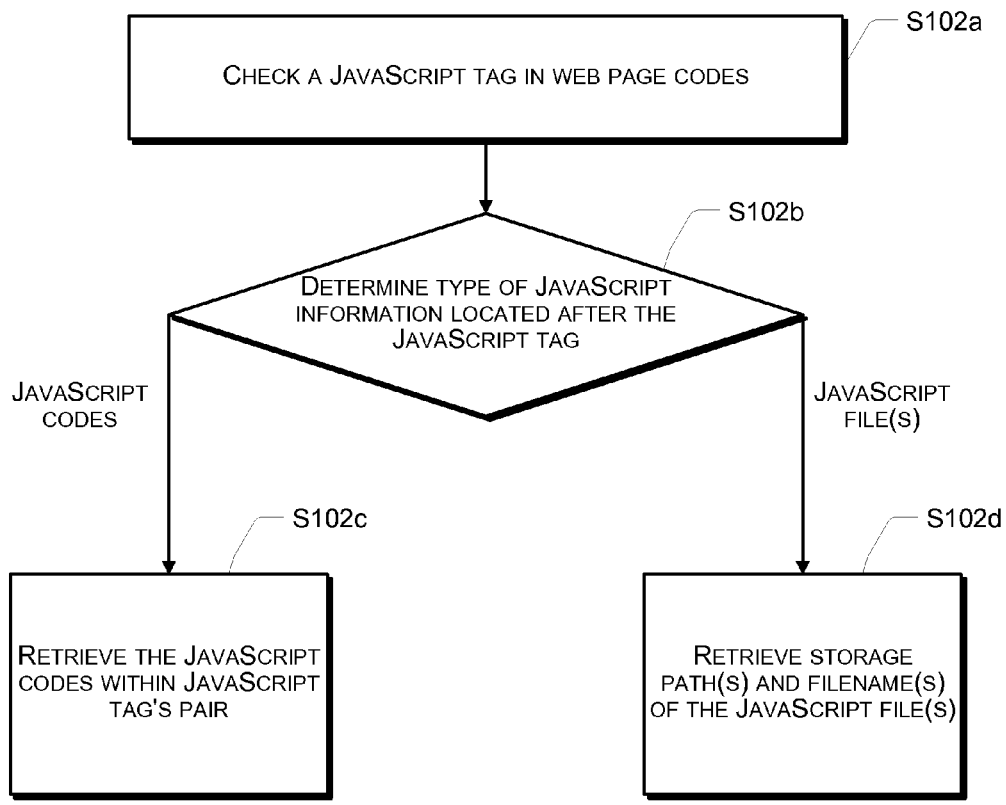
FIG. 2 shows a flow chart of a method of retrieving JavaScript information of web page codes in accordance with the exemplary embodiments of the present disclosure.

Based on the above two approaches, the JavaScript information in the HTML codes can be retrieved by checking the <script> tag in the web page codes. As shown in FIG. 2, a method of retrieving JavaScript information of web page codes may include the following procedures.

S102*a* checks a JavaScript tag in the web page codes.

S102*b* determines the type of JavaScript information located after the JavaScript tag. If the type corresponds to JavaScript codes, S102*c* is executed. If the type corresponds to JavaScript files, S102*d* is executed.

S102*c* retrieves the JavaScript codes within the JavaScript tag's pair.

S102*d* retrieves storage paths and filenames of the JavaScript files.

Upon carrying out the above procedures for all nodes of <script> tags in a HTML file code, a certain number of JavaScript codes and/or JavaScript files and respective storage paths are obtained. All the retrieved JavaScript codes may be stored in a temporary .js file (e.g., temp.js). With respect to the JavaScript files, analyzing all the codes of the JavaScript files is not required in the technical scheme of the present disclosure. Only the retrieved JavaScript filenames and respective storage paths may be stored at this block.

S103 analyzes the JavaScript information to determine functions that include Ajax calls in the web page codes.

Generally, two types of JavaScript files are referenced in web page codes. One type refers to JavaScript framework documents. This type of file generally has a fixed filename, prototype.js, for example. Another type refers to non-JavaScript framework documents. Within web page codes, functions that include Ajax calls are defined in the non-JavaScript framework document. As such, contents of the JavaScript framework document may not need to be further analyzed. However, property values, corresponding to its framework type, can be found based on its filename. Moreover, functions that include Ajax calls, and are defined in the non-JavaScript framework document, may be found using these property values. Furthermore, functions that include Ajax calls in the web page codes may then be found. Specific procedures are shown as follows.

S103*a* determines the file type of a JavaScript file based on the filename of the JavaScript file.

According to the above method, determination is made as to whether the JavaScript file is a framework document or a non-framework document. If determined to be a framework document, corresponding property values are obtained.

S103*b* determines functions, which include Ajax calls, and are defined in a non-JavaScript framework document based on the Ajax property values.

In a JavaScript file, all functions that include Ajax calls must include a specific piece of code which are called Ajax property values. Therefore, whether a function includes an Ajax call can be determined based on whether the function includes these property values.

Ajax property values may be categorized into two types. Apart from the aforementioned property values that correspond to various types of JavaScript framework, other property values exist in a situation when Ajax is called without using any type of JavaScript framework. These latter property values may be stored in advance in a database file. By matching codes of functions in a non-JavaScript framework document with these property values, functions that include Ajax calls can be determined S103*c* further determines functions that include Ajax calls in the web page codes based on a result of S103*b*.

An assumption is made that functions used in the web page code constitute collection A and functions that have been determined at S103*b* to include Ajax calls constitute collection B. The intersection of A and B corresponds to the required functions that include Ajax calls in the web page codes. A function that is not called in the web page, i.e., a function that belongs to collection B but does not belong to collection A, may not need to undergo further processing.

It should be noted that S103*a* may be skipped if the JavaScript information obtained at S102 includes only JavaScript codes without JavaScript. Furthermore, the temporary file, temp.js, which is used to store the JavaScript codes as described above, may be processed as a non-framework document here.

S104 triggers the functions that include Ajax calls to obtain web page content.

Upon determining which function includes Ajax calls in the web page code, web page content that is generated dynamically by Ajax can be obtained through triggering these functions.

A number of functions that include Ajax calls are triggered by user operations, e.g., by mouse clicking or selection. These operations may be realized by simulating operations of a browser. Specifically, API (i.e., Application Programming Interface) provided by certain Web automated testing tools may be used to simulate relevant operations performed by a user in a browser. For example, through the above procedures of S101-S103, a function getinfo on http://www.test.com may be found to include an Ajax call with the function being triggered by mouse clicking. Therefore, the following method may be used to simulate triggering of this function:

```
IE ie = new IE( );
// Simulate an operation of opening a browser
ie.start(http://www.test.com);
// Simulate entering http://www.test.com into the browser to open this web page
```

-continued

```
HtmlElement e=ie.htmlElement(attribute("onclick", "getInfo"));
    // Found an element node of the JavaScript function, getInfo, that is
called upon click
    e.click( );
    // Simulate an operation of clicking the element node through a
mouse
```

Upon simulating mouse clicking, the function is triggered and the content that is dynamically generated by this function can be obtained correspondingly.

Through analyzing JavaScript information in web page codes, the above technical scheme obtains functions that include Ajax calls in the web page codes and further triggers the function to obtain web page content generated thereby, thus achieving retrieval of dynamic content in an Ajax web page. Using the above technical scheme, a search engine can collect more complete web page contents and hence provide a better search service to users.

The method of retrieving Ajax web page content in accordance with the present disclosure is described below using a specific exemplary embodiment. Details of S201-S204 can be found in corresponding textual descriptions of S101-S104.

S201 obtains information of web page codes.

Let assume the following code information of a certain web page is obtained based on an URL address:

```
<!DOCTYPE HTML PUBLIC "-//W3C//DTD HTML 4.01//EN"
"http://www.w3.org/TR/html4/strict.dtd">
<html lang="en">
    <head>
    <script type="text/javascript" src="js/prototype.js" />
    <script type="text/javascript" src="js/ajax.js" />
    <title>AJAX, Web 2.0 example</title>
    <link rel="stylesheet" type="text/css" href="css/style.css" />
    </head>
    <body>
        <div id="navhover">
            <img src="img/hammer.jpg" alt="Builders">
            <img src="img/lightbulb.jpg" alt="Electricians">
            <img src="img/wrench.jpg" alt="Plumbers">
            <img src="img/taxi.jpg" alt="Taxis">
        </div>
        <div id="nav">
            <ul>
                <li><a href="#" onclick="getInfo(1);" id="nav1"
                    title="Electricians"><span>Builders</span></a></li>
                <li><a href="#" onclick="getInfo(2);" id="nav2"
                    title="Plumbers"><span>Electricians</span></a></li>
                <li><a href="#" onclick="getInfo(3);" id="nav3"
                    title="Builders"><span>Plumbers</span></a></li>
            </ul>
            <ul>
                <li><img src="img/taxi.jpg" onclick='getInfo(4);'
                    id="img" name="img" style="cursor:hand"></li>
            </ul>
        </div>
        <div id="results">Search results...</div>
    </body>
</html>
```

It should be noted that the real codes provided in this exemplary embodiment are only meant for the purpose of illustrating the disclosed technical scheme and should be not construed as a limitation of the technical scheme.

S202 retrieves JavaScript information of the web page codes.

According to the description at S102, the above codes are found to have no JavaScript codes directly embedded. However, JavaScript files, i.e., the two files "prototype.js" and "ajax.js" located within <head> part, are referenced. Information such as paths and filenames of these two files may be stored.

S203 analyzes the JavaScript information to determine functions that include Ajax calls in the web page codes.

S203a may determine that "prototype.js" is a framework document and "ajax.js" is a non-framework document based on the filenames of these two JavaScript files retrieved at S202.

Based on the types of the two JavaScript files being referenced, S203b may know that two relevant Ajax property values possibly exist in the web page if an Ajax call exists. The first type is an Ajax calling method provided in the prototype framework with its property value as: "new Ajax.Request".

Another type corresponds to a situation when no JavaScript framework is used. Respective property value is:
    "new ActiveObject("Microsoft.XMLHTTP")".

The non-framework document, "ajax.js", is then further analyzed. Assume contents of the codes of "ajax.js" be the following:

```
function getInfo(id){
    var xmlhttp;
    try{
        xmlhttp=new XMLHttpRequest( );
    }catch(e){
        xmlhttp=new ActiveXObject("Microsoft.XMLHTTP");
    }
    xmlhttp.onreadystatechange=function( ){
        if(xmlhttp.readyState == 1){
            document.getElementById('results').innerHTML =
            'Loading...';
        }
        if(xmlhttp.readyState == 4){
            var response = xmlhttp.responseText;
            document.getElementById('results').innerHTML =
            response;
        }
    }
    xmlhttp.open('get', 'data.jsp?company=' + id, true);
    xmlhttp.send("company="+id);
}
function getDate( )
{
    var date = new Date( );
    var year = date.getYear( );
    var month = date.getMonth( )+1;
    var day = date.getDay( );
    return
year+""+(month>=10?month:("0"+""+month))+""+(day>=
10?day:("0"+""+day));
}
function getDateTime( )
{
    var date = new Date( );
    var localeString = date.toLocaleString( );
    return localeString;
}
function sameToBilling(obj)
{
    var my = new Ajax.Request(url,
    {
        method: 'get',
        parameters: pars,
        asynchronous: true ,
        onComplete: showResponse
    } );
}
```

Four functions are found to be defined in "ajax.js" and are getInfo( ) getDate( ), getDateTime( ) and sameToBilling( ) respectively. Moreover, property values "new ActiveXObject("Microsoft.XMLHTTP")" and "new Ajax.Request" appear in the getInfo( ) function and the sameToBilling( )

function, respectively. As a result, getInfo( ) and sameToBilling( ) can be determined to be functions that include Ajax calls.

S203c may determine that getInfo( ) is a function that includes an Ajax call in the web page codes based on the intersection of Collection A (of functions that are used in the web page codes) and Collection B (of functions that include Ajax calls in the referenced JavaScript file). On the other hand, the sameToBilling( ) function may not be further processed because the sameToBilling( ) function was not called in the web page.

S204 triggers the functions that include the Ajax calls to obtain web page content.

getInfo( ) is triggered by simulating the onclick (i.e., mouse clicking) operation to obtain web page content generated thereby.

As illustrated in the above exemplary embodiment, the technical scheme provided in this disclosure determines which function (that is defined in a referenced file) includes an Ajax call by analyzing web page codes and on Ajax property values. Within the scope thereof, functions that are actually called in associated web page are found. Moreover, web page content is obtained by simulating execution of these functions, thus avoiding execution of a function that is unrelated to the web page content. As a result, efficiency of retrieving dynamic web page content is improved.

Figure 3:
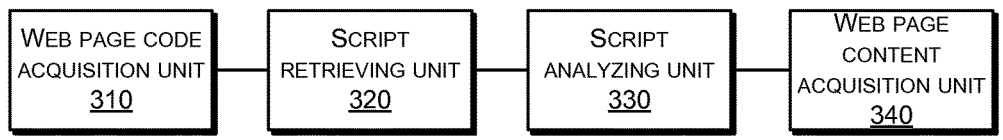
FIG. 3 shows a schematic structural diagram of a system of retrieving Ajax web page content in accordance with the exemplary embodiments of the present disclosure.

Corresponding to the above exemplary method, the exemplary embodiments of the present disclosure further provide a system of retrieving Ajax web page content. As shown in FIG. 3, the system includes:

a web page code acquisition unit 310, used for obtaining information of web page codes;

a script retrieving unit 320, used for retrieving JavaScript information of the web page codes;

a script analyzing unit 330, used for analyzing the JavaScript information to determine functions that include Ajax calls in the web page codes; and a web page content acquisition unit 340, used for triggering the functions that include the Ajax calls to obtain web page content.

The JavaScript information may include JavaScript files and/or JavaScript codes.

Figure 4:
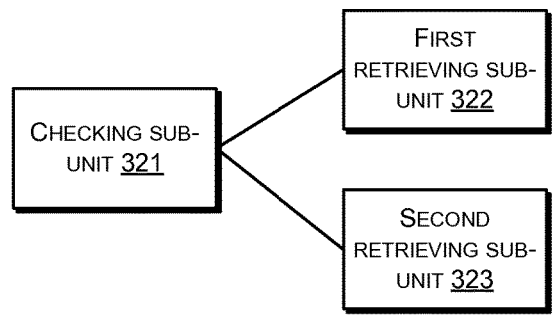
FIG. 4 shows a schematic structural diagram of a script retrieving unit in accordance with the exemplary embodiments of the present disclosure.

As shown in FIG. 4, the script retrieving unit 320 may include:

a checking sub-unit 321, which is used for checking a JavaScript tag in the web page codes;

a first retrieving sub-unit 322, which is used when the JavaScript information, located after the JavaScript tag, corresponds to JavaScript codes, and retrieving the JavaScript codes and storing the retrieved codes into a JavaScript file;

a second retrieving sub-unit 323, which is used when the JavaScript information, located after the JavaScript tag, corresponds to JavaScript file, and retrieving the storage path and the filename of the JavaScript file.

Figure 5:
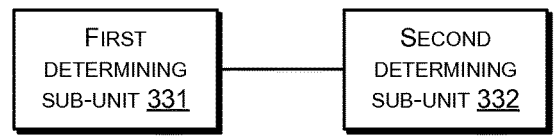
FIG. 5 shows a schematic structural diagram of a script analyzing unit in accordance with the exemplary embodiments of the present disclosure.

As shown in FIG. 5, the script analyzing unit 330 may include:

a first determining sub-unit 331, used for determining functions that include Ajax calls and are defined in the JavaScript file based on Ajax property values, where the Ajax property values refer to code segments indicating an existence of an Ajax call in a function; and a second determining sub-unit 332, used for further determining functions that include Ajax calls in the web page codes from among the functions that have been determined by the first determining sub-unit 331.

The Ajax property values may include: property values corresponding to Ajax calls using a type of JavaScript framework and/or property values corresponding to Ajax calls without using any type of JavaScript framework.

The first determining sub-unit 331 may be used for determining functions that contain Ajax calls and are defined in a non-JavaScript framework document that is referenced in the web page.

The web page content acquisition unit 340 may be used for triggering the functions that include the Ajax calls by simulating a user operation to obtain the web page content.

Because of its fundamental correspondence with the exemplary method, the exemplary system has been described in a relatively simple manner. Details thereof can be referred to pertinent parts of the exemplary method. Descriptions of the above exemplary system are only meant for illustrative purpose. Units described as separate components therein may or may not be separate in a physical sense. Components illustrated in terms of units may or may not be physical units, i.e., may be located in one place or may be distributed among multiple network units. Based on actual needs, the goal of the exemplary embodiments may be achieved by selecting parts or all of the modules. A person of ordinary skills in the art can understand and implement the disclosed system without any innovative effect.

For the sake of description, the above system was divided into various units which were separately described. The functions of various units may be implemented in one or more software and/or hardware when implementing the disclosed system.

From the exemplary embodiments described above, someone skilled in the art can clearly understand that the disclosed method and system may be implemented using software and universal hardware platforms. Based on this understanding, the technical scheme of the present disclosure, or portions contributing to existing technologies, may be implemented in the form of software products which are stored in a storage media such as ROM/RAM, disk and drive. The software includes instructions for a computing device (e.g., personal computer, server or network device) to execute the method described in various exemplary embodiments or a certain part of the exemplary embodiment of the current disclosure.

Above are only a few exemplary embodiments of the present disclosure. It is understood that a person of ordinary skills in the art can alter or modify the current disclosure in many different ways without departing from the spirit and the scope of this disclosure. These alterations and modifications should be considered to fall within the scope of the claims of the present disclosure and their equivalents.

What is claimed is:

1. One or more non-transitory storage media comprising computer-executable instructions that, when executed by a computer, perform acts comprising:

retrieving scripting language information from a web page code, the scripting language information being included in one or more external files;

determining a type of one scripting file of the one or more scripting language files based on a file name of the one scripting file, in an event that the one scripting file is determined to be a framework file:

determining whether the framework file defines one or more functions including one or more Asynchronous JavaScript and XML (Ajax) calls, and in response to determining that the framework file defines one or more functions including one or more Ajax calls, obtaining Ajax property values, and determining at least one Ajax function in the web page code using the obtained Ajax property values; and in an event that the one scripting file is a non-framework file:
obtaining at least one function based on corresponding Ajax property values and determining at least one Ajax function in the web page code using the Ajax property values associated with the function as defined in the non-framework file;
simulating a user operation corresponding to the at least one Ajax function in the web page code; and
calling the function to generate content associated with the web page code in response to the simulated user operation.

2. The one or more non-transitory storage media as recited in claim 1, wherein the acts further comprise obtaining the web page code in a markup language format, and wherein the web page code includes a location or a filename of the one or more files.

3. The one or more non-transitory storage media as recited in claim 1, wherein the web page code includes the scripting language information or indicates a document including scripting language information.

4. The one or more non-transitory storage media as recited in claim 1, wherein the web page code is associated with a markup language.

5. The one or more non-transitory storage media as recited in claim 4, wherein the markup language includes a HyperText Markup Language (HTML), and wherein the scripting language information is located in a tag pair of a HTML file corresponding to the web page code.

6. A method of retrieving web page content, the method comprising:
retrieving, by a computing device, scripting language information from a web page code, the scripting language information being included in one or more external files;
determining a type of one scripting file of the one or more scripting language files based on a file name of the one scripting file,
in an event that the one scripting file is determined to be a framework file:
determining whether the framework file defines one or more functions including one or more Asynchronous JavaScript and XML (Ajax) calls, and
in response to determining that the framework file defines one or more functions including one or more Ajax calls, obtaining Ajax property values, and determining at least one Ajax function in the web page code using the obtained Ajax property values; and in an event that the one scripting file is a non-framework file:
obtaining at least one function based on corresponding Ajax property values and determining at least one Ajax function in the web page code using the Ajax property values associated with the function as defined in the non-framework file;
simulating a user operation corresponding to the at least one Ajax function in the web page code; and
calling the function to generate content associated with the web page code in response to the simulated user operation.

7. The method as recited in claim 6, wherein the method further comprises obtaining a web page code obtaining the web page code in a markup language format, and wherein the web page code includes a location or a filename of the one or more files.

8. The method as recited in claim 6, wherein the web page code includes the scripting language information or indicates a document including scripting language information.

9. The method as recited in claim 6, wherein the web page code is associated with a markup language.

10. The method as recited in claim 9, wherein the markup language includes a HyperText Markup Language (HTML), and wherein the scripting language information is located in a tag pair of a HTML file corresponding to the web page code.

11. A computing device comprising:
one or more processors; and
memory to maintain a plurality of components executable by the one or more processors, the plurality of components comprising:
a script retrieving unit configured to retrieve scripting language information from the web page code the scripting language information being included in one or more external files;
a script analyzing unit configured to:
determine a type of one scripting file of the one or more scripting language files based on a file name of the one scripting file,
in an event that the one scripting file is determined to be a framework file:
determine whether the framework file defines one or more functions including one or more Asynchronous JavaScript and XML (Ajax) calls, and
in response to determining that the framework file defines one or more functions including one ore more Ajax calls, obtain Ajax property values, and determine at least one Ajax function in the web page code using the obtained Ajax property values; and
in an event that the one scripting file is a non-framework file:
obtaining at least one function based on corresponding Ajax property values and determining at least one Ajax function in the web page code using the Ajax property values associated with the function as defined in the non-framework file;
a web page content acquisition unit configured to:
simulate a user operation corresponding to the at least one Ajax function in the web page code, and
call the function to generate content associated with the web page code in response to the simulated user operation.

12. The system as recited in claim 11, wherein the plurality of components further comprises a web page code acquisition unit configured to obtain a web page code.

13. The system as recited in claim 12, wherein the web page code is in a markup language format, and wherein the web page code includes a location or a filename of the one or more files.

14. The system as recited in claim 11, wherein the web page code includes the scripting language information or indicates a document including scripting language information.

15. The system as recited in claim 11, wherein the web page code is associated with a markup language.

16. The system as recited in claim 15, wherein the markup language includes a HyperText Markup Language (HTML), and wherein the scripting language information is located in a tag pair of a HTML file corresponding to the web page code.

* * * * *